United States Patent
Wuidart

(10) Patent No.: US 9,507,975 B2
(45) Date of Patent: Nov. 29, 2016

(54) PROTECTION OF COMMUNICATION BETWEEN AN ELECTROMAGNETIC TRANSPONDER AND A TERMINAL

(75) Inventor: Luc Wuidart, Pourrières (FR)

(73) Assignee: STMICROELECTRONICS (ROUSSET) SAS, Roussset (FR)

( * ) Notice: Subject to any disclaimer, the term of this patent is extended or adjusted under 35 U.S.C. 154(b) by 273 days.

(21) Appl. No.: 14/123,751

(22) PCT Filed: Apr. 18, 2012

(86) PCT No.: PCT/FR2012/050844
§ 371 (c)(1),
(2), (4) Date: Dec. 16, 2013

(87) PCT Pub. No.: WO2012/164180
PCT Pub. Date: Dec. 6, 2012

(65) Prior Publication Data
US 2014/0118115 A1     May 1, 2014

(30) Foreign Application Priority Data

Jun. 3, 2011    (FR) ...................................... 11 54863

(51) Int. Cl.
| | |
|---|---|
| *G06K 7/10* | (2006.01) |
| *G06K 7/00* | (2006.01) |
| G06K 19/073 | (2006.01) |
| G06K 19/07 | (2006.01) |
| H04B 5/00 | (2006.01) |

(52) U.S. Cl.
CPC ......... *G06K 7/10019* (2013.01); *G06K 7/0008* (2013.01); *G06K 7/10128* (2013.01); *G06K 7/10237* (2013.01); *G06K 7/10386* (2013.01); *G06K 19/0723* (2013.01); *G06K 19/07309* (2013.01); *G06K 19/07318* (2013.01); *H04B 5/0068* (2013.01)

(58) Field of Classification Search
None
See application file for complete search history.

(56) References Cited

U.S. PATENT DOCUMENTS

| | | |
|---|---|---|
| 5,703,573 A | 12/1997 | Fujimoto et al. |
| 6,356,198 B1 | 3/2002 | Wuidart et al. |
| 6,462,647 B1 | 10/2002 | Roz |
| 6,473,028 B1 | 10/2002 | Luc |
| 6,547,149 B1 | 4/2003 | Wuidart et al. |

(Continued)

FOREIGN PATENT DOCUMENTS

| | | |
|---|---|---|
| EP | 0 722 094 A1 | 7/1996 |
| EP | 0857981 | 8/1998 |

(Continued)

OTHER PUBLICATIONS

English Translation of the Written Opinion of the International Searching Authority dated Dec. 4, 2013 from corresponding International Application No. PCT/FR2012/050844.

(Continued)

*Primary Examiner* — Benjamin C Lee
*Assistant Examiner* — Rajsheed Black-Childress
(74) *Attorney, Agent, or Firm* — Seed IP Law Group LLP

(57) ABSTRACT

A method for protecting communication between an electromagnetic transponder and a terminal, wherein the transmission of a polling request by the terminal is only allowed when the transponder is in mechanical contact or in quasi-mechanical contact with the terminal.

18 Claims, 5 Drawing Sheets

(56) References Cited

U.S. PATENT DOCUMENTS

Figure 1:
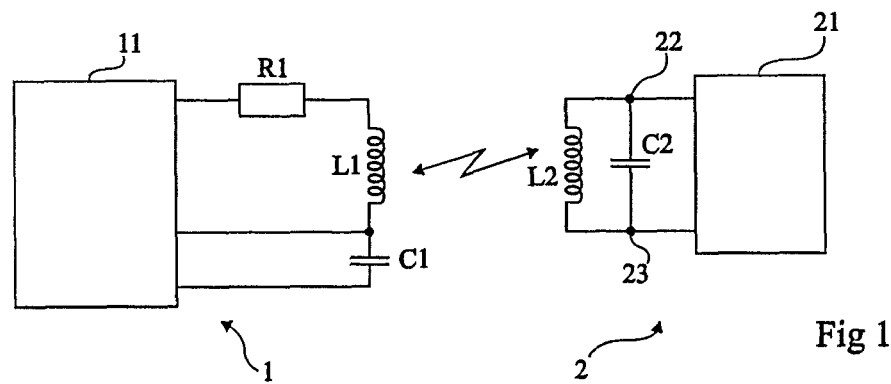

| | | |
|---|---|---|
| 6,650,226 B1 | 11/2003 | Wuidart et al. |
| 6,650,229 B1 | 11/2003 | Wuidart et al. |
| 6,703,921 B1 | 3/2004 | Wuidart et al. |
| 6,784,785 B1 | 8/2004 | Wuidart et al. |
| 6,879,246 B2 | 4/2005 | Wuidart |
| 6,944,424 B2 | 9/2005 | Heinrich et al. |
| 6,950,008 B2 | 9/2005 | Hagl et al. |
| 6,960,985 B2 | 11/2005 | Wuidart |
| 7,005,967 B2 | 2/2006 | Wuidart |
| 7,046,121 B2 | 5/2006 | Wuidart |
| 7,049,935 B1 | 5/2006 | Wuidart et al. |
| 7,049,936 B2 | 5/2006 | Wuidart |
| 7,058,357 B1 | 6/2006 | Wuidart et al. |
| 7,107,008 B2 | 9/2006 | Wuidart |
| 7,263,330 B2 | 8/2007 | Wuidart |
| 7,606,532 B2 | 10/2009 | Wuidart |
| 7,995,965 B2 | 8/2011 | Wuidart |
| 8,130,159 B2 | 3/2012 | Wuidart et al. |
| 8,395,485 B2 | 3/2013 | Wuidart |
| 8,446,259 B2 | 5/2013 | Wuidart |
| 8,482,388 B2 | 7/2013 | Wuidart |
| 8,564,413 B2 | 10/2013 | Wuidart |
| 8,676,163 B2 | 3/2014 | Wuidart |
| 8,693,956 B2 | 4/2014 | Wuidart |
| 8,718,552 B2 | 5/2014 | Wuidart |
| 8,798,533 B2 | 8/2014 | Wuidart |
| 8,907,761 B2 | 12/2014 | Wuidart |
| 8,922,338 B2 | 12/2014 | Wuidart |
| 8,922,341 B2 | 12/2014 | Wuidart |
| 8,988,196 B2 | 3/2015 | Wuidart |
| 9,098,788 B2 | 8/2015 | Wuidart |
| 2003/0071717 A1 | 4/2003 | Hagl et al. |
| 2003/0121985 A1 | 7/2003 | Baldischweiler et al. |
| 2003/0169169 A1 | 9/2003 | Wuidart et al. |
| 2004/0104809 A1 | 6/2004 | Rizzo et al. |
| 2005/0001609 A1 | 1/2005 | Cuylen |
| 2005/0141256 A1 | 6/2005 | Yamazaki et al. |
| 2005/0231328 A1 | 10/2005 | Castle et al. |
| 2006/0172702 A1 | 8/2006 | Wuidart et al. |
| 2007/0164122 A1 | 7/2007 | Ju |
| 2008/0079542 A1 | 4/2008 | Rofougaran |
| 2008/0129509 A1 | 6/2008 | Duron |
| 2008/0136643 A1 | 6/2008 | Yeo et al. |
| 2008/0204206 A1 | 8/2008 | Frohler |
| 2009/0065575 A1 | 3/2009 | Phillips et al. |
| 2009/0273452 A1 | 11/2009 | Wuidart |
| 2010/0068999 A1* | 3/2010 | Bangs ............... G06K 7/0008 455/41.1 |
| 2010/0282849 A1* | 11/2010 | Mair ............... G06K 7/10128 235/439 |
| 2010/0283698 A1 | 11/2010 | Orihara |
| 2010/0291871 A1* | 11/2010 | Butler ............... G06K 19/0701 455/41.1 |
| 2010/0323629 A1 | 12/2010 | Wuidart |
| 2010/0328026 A1* | 12/2010 | Wuidart ............ G06K 19/07336 340/5.8 |
| 2010/0328045 A1 | 12/2010 | Goto et al. |
| 2011/0095769 A1 | 4/2011 | Wuidart |
| 2011/0140852 A1 | 6/2011 | Wuidart |
| 2011/0193688 A1 | 8/2011 | Forsell |
| 2011/0319016 A1 | 12/2011 | Gormley et al. |
| 2012/0092901 A1 | 4/2012 | Wuidart |
| 2012/0105012 A1 | 5/2012 | Wuidart |
| 2014/0113554 A1 | 4/2014 | Wuidart |
| 2014/0113692 A1* | 4/2014 | Wuidart ............ G06K 19/0701 455/575.1 |
| 2014/0118115 A1 | 5/2014 | Wuidart |

FOREIGN PATENT DOCUMENTS

| | | |
|---|---|---|
| EP | 1 043 677 A1 | 10/2000 |
| EP | 1 071 038 A1 | 1/2001 |
| EP | 1 304 661 A1 | 4/2003 |
| EP | 2077518 A1 | 7/2009 |
| EP | 2114019 A1 | 11/2009 |
| FR | 2 757 952 A1 | 7/1998 |
| FR | 2012/050842 | 4/2012 |
| FR | 2012/050843 | 4/2012 |
| FR | 2012/050845 | 4/2012 |
| GB | 2 321 725 A | 8/1998 |
| GB | 2464362 A | 4/2010 |
| WO | 2009/105115 A2 | 8/2009 |

OTHER PUBLICATIONS

U.S. Appl. No. 14/123,739, filed Dec. 16, 2013, Luc Wuidart.
U.S. Appl. No. 14/123,745, filed Dec. 3, 2013, Luc Wuidart.
U.S. Appl. No. 14/123,755, filed Dec. 16, 2013, Luc Wuidart.
International Search Report dated Sep. 7, 2012 from corresponding International Application No. PCT/FR2012/050844.
International Search Report dated Sep. 10, 2012 from potentially related International Application No. PCT/FR2012/050842.
International Search Report dated Jun. 26, 2012 from potentially related International Application No. PCT/FR2012/050843.
International Search Report dated Sep. 7, 2012 from potentially related International Application No. PCT/FR2012/050845.
English Translation of the Written Opinion of the International Searching Authority dated Dec. 4, 2013 from corresponding International Application No. PCT/FR2012/050842, 5 pages.
English Translation of the Written Opinion of the International Searching Authority dated Dec. 4, 2013 from corresponding International Application No. PCT/FR2012/050843, 10 pages.
English Translation of the Written Opinion of the International Searching Authority dated Dec. 4, 2013 from corresponding International Application No. PCT/FR2012/050845, 6 pages.
French Search Report dated Feb. 9, 2010, for corresponding FR Application No. 0954147, 2 pages.
French Search Report dated Feb. 9, 2010, for corresponding FR Application No. 0954148, 2 pages.
French Search Report dated Feb. 8, 2010, for corresponding FR Application No. 0954149, 2 pages.
French Search Report dated Feb. 2, 2010, for corresponding FR Application No. 0954345, 2 pages.
French Search Report dated Feb. 3, 2010, for corresponding FR Application No. 0954347, 2 pages.
French Search Report dated Feb. 17, 2010, for corresponding FR Application No. 0954351, 2 pages.
Translation of International Search Report and Written Opinion dated Jun. 3, 2010, for corresponding International Application No. PCT/FR2010/051090, 4 pages.
Translation of International Search Report and Written Opinion dated Jun. 3, 2010, for corresponding International Application No. PCT/FR2010/051091, 4 pages.

* cited by examiner

PROTECTION OF COMMUNICATION BETWEEN AN ELECTROMAGNETIC TRANSPONDER AND A TERMINAL

CROSS REFERENCE TO RELATED APPLICATIONS

This application is the U.S. National Stage of international patent application number PCT/FR2012/050844, filed on Apr. 18, 2012, which claims the priority benefit of French patent application number 11/54863, filed on Jun. 3, 2011, which applications are hereby incorporated by reference to the maximum extent allowable by law.

BACKGROUND

Technical Field

Embodiments generally relate to systems using transponders, that is, transceivers (generally mobile) capable of communicating in a contactless and wireless manner with a terminal. Embodiments more specifically relate to the securing of a near field communication between a transponder and a reader.

Discussion of the Related Art

Electromagnetic transponder systems are more and more used with the coming up of mobile telecommunication devices equipped with near field communication routers (NFC). In such devices, the mobile equipment may be used both as a transponder reader, for example, as a contactless chip card reader and, conversely, as an actual transponder for a near field communication with a terminal, for example, another mobile device, an access terminal, etc.

Many methods aiming at protecting transactions between an electromagnetic transponder and a reader are known. Such mechanisms generally use systems for encrypting communications, be it by symmetrical or asymmetrical algorithms.

All these systems require an established communication to make a protection of the transaction possible.

Further, such methods are generally inefficient to prevent a pirate device simulating a transponder from starting a communication with a reader.

GB-A-2464362 discloses a communication interface comprising a RFID reader glove.

EP-A-2077518 discloses a detection system of the presence of a transponder by reduction of the resonance frequency.

SUMMARY

An embodiment provides a mechanism for protecting a communication between an electromagnetic transponder and a terminal, which overcomes all or part of the disadvantages of usual solutions.

Another embodiment provides a solution which does not require establishing a communication to detect the possible presence of a pirate transponder.

Another embodiment provides a solution compatible with usual communication encryption processes.

To achieve all or part of these and other objects, one provides a method for protecting a communication between an electromagnetic transponder and a terminal, wherein the transmission of a polling request by the terminal is only allowed when the transponder is in mechanical contact or in quasi-mechanical contact with the terminal.

According to an embodiment:
a) a first value of the current in an oscillating circuit of the terminal is periodically measured;
b) a second value of a ratio between a no-load value of this current, stored when no transponder is in the field of the terminal, and the first value, is calculated;
c) said second value is compared with a third value of said ratio calculated in a previous iteration; and
d) as long as the second and third values are not equal, steps a to c are repeated.

According to an embodiment, in case the second and third values are equal:
e) the second value is compared with a threshold;
f) the sending of a request is allowed if this threshold has not been reached;
g) it is returned to step a) if this threshold has been exceeded.

According to an embodiment, if said threshold has been reached, the sending of the request is preceded by an increase in the value of a resistive element of the oscillating circuit if the second value is greater than 2.

According to an embodiment, if the second value is smaller than the third one, the possible transmission of a request is blocked.

According to an embodiment:
step b) is preceded by a comparison of the first value with the no-load value; and
in case of an identity, it is returned to step a), or
in the opposite case, it is proceeded to step c).

One also provides a terminal of communication with an electromagnetic transponder, comprising means capable of implementing the method.

One also provides a cell phone comprising such a terminal.

Figure 2:
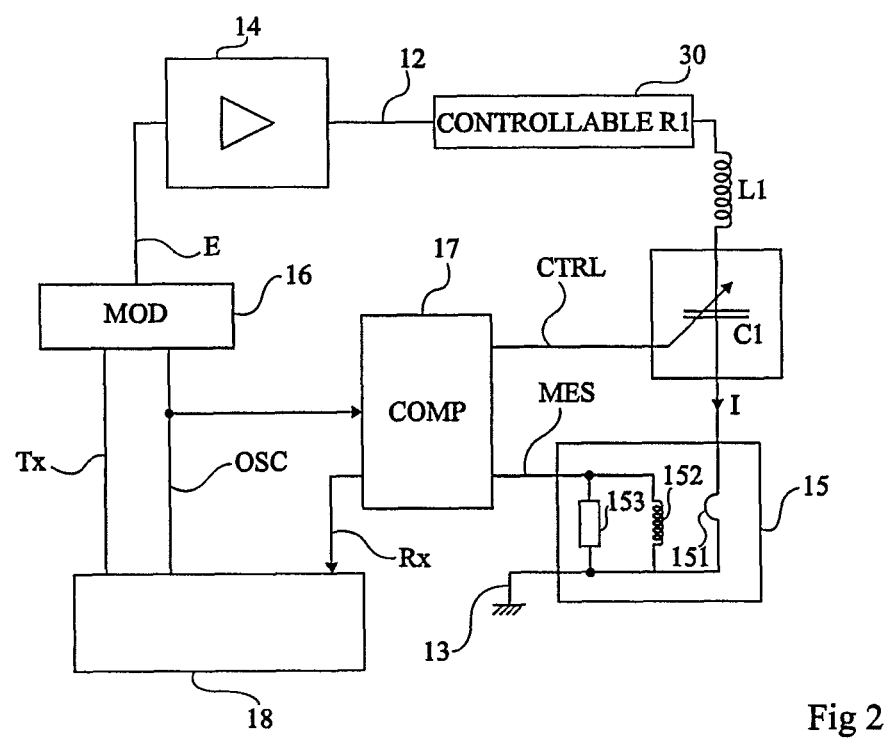
Figure 3:
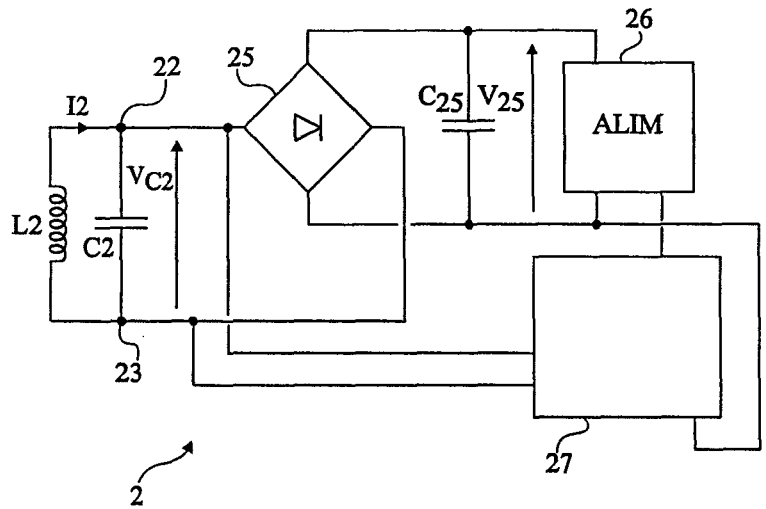
Figure 4:
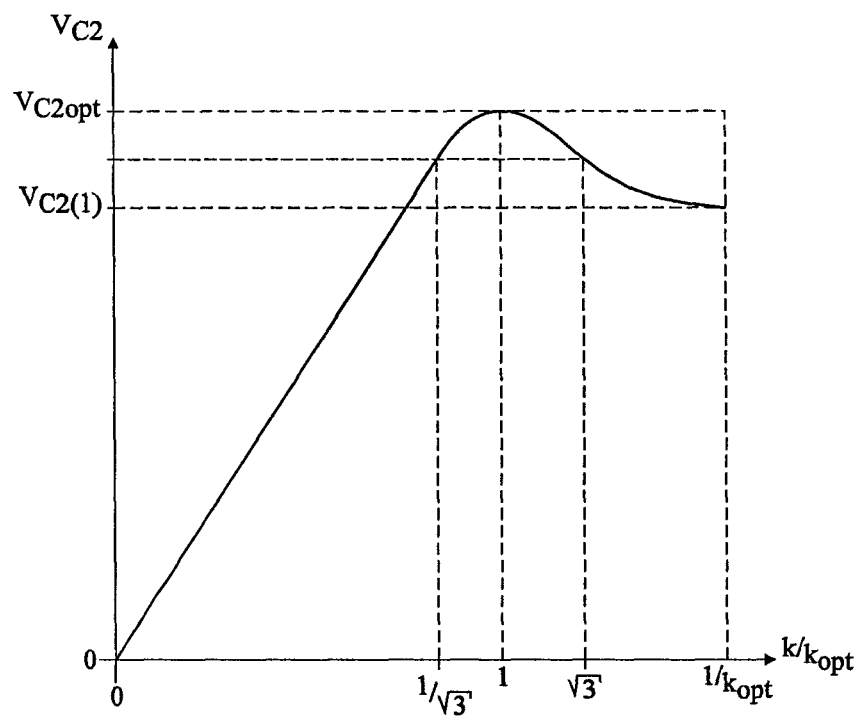
Figure 5:
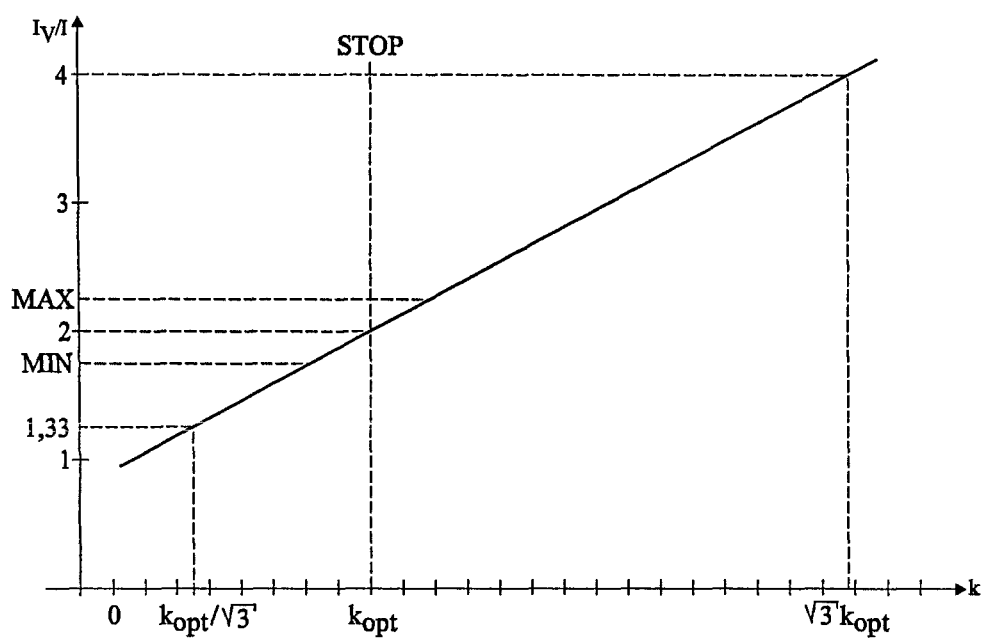
Figure 6:
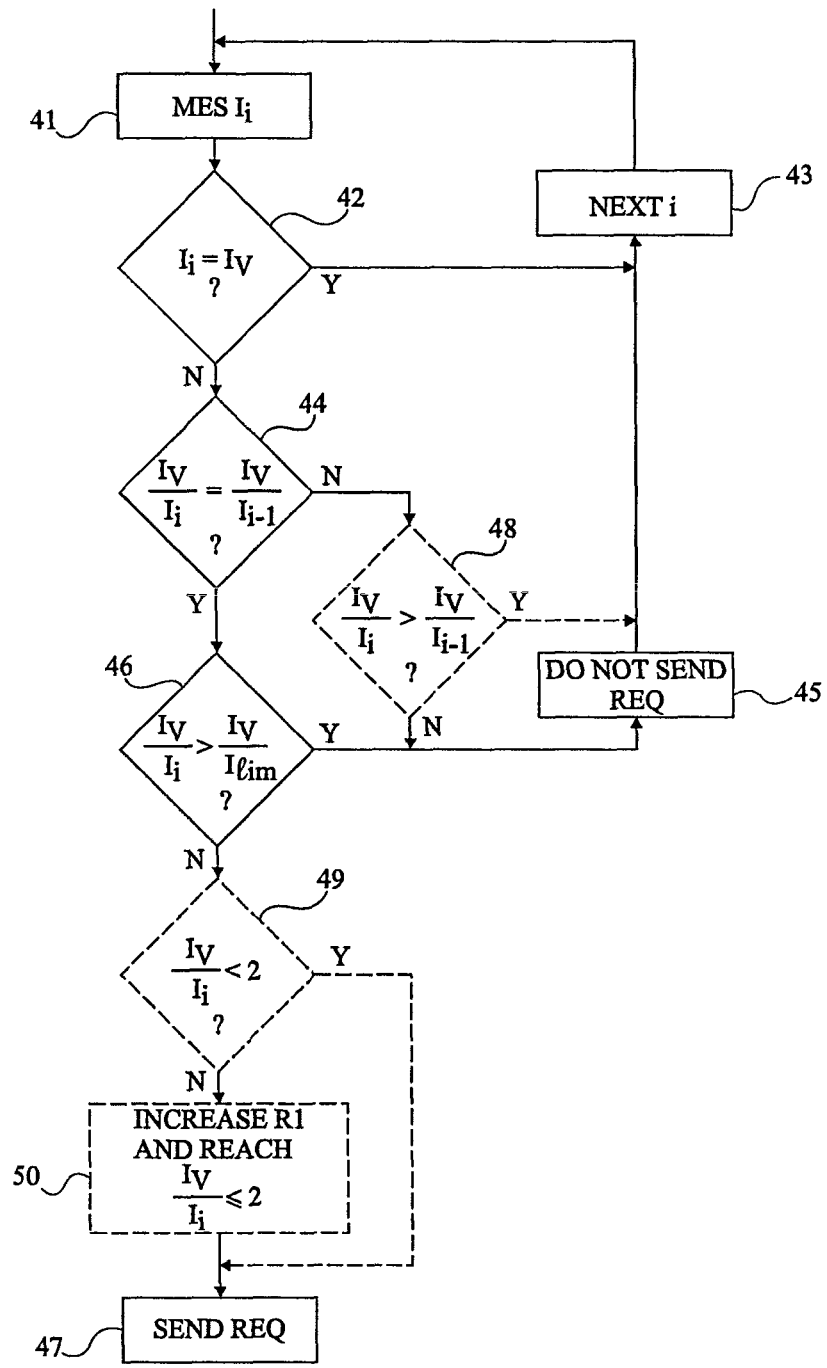
Figure 7:
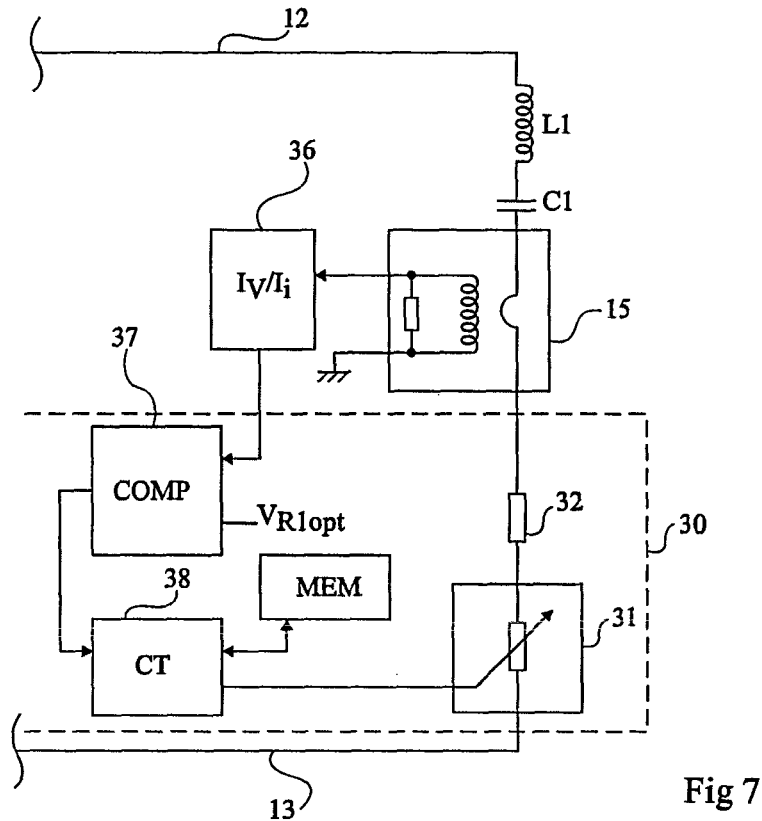
Figure 8:
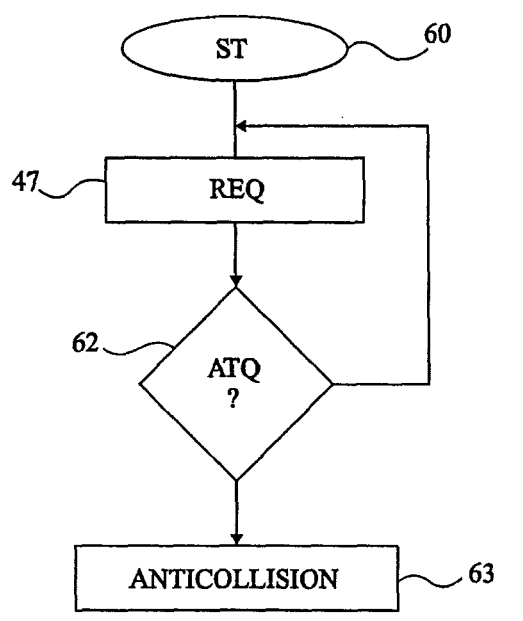

The foregoing and other objects, features, and advantages will be discussed in detail in the following non-limiting description of specific embodiments in connection with the accompanying drawings, among which:

BRIEF DESCRIPTION OF THE DRAWINGS among which:
FIG. 1 very schematically shows an example of a transponder near-field communication system;
FIG. 2 is a simplified block diagram of the terminal of FIG. 1;
FIG. 3 is a simplified block diagram of the transponder of FIG. 1;
FIG. 4 illustrates an example of the variation of the voltage across the resonant circuit of the transponder according to a normalized coupling;
FIG. 5 illustrates the variation of a current ratio in the oscillating circuit of the reader according to the coupling;
FIG. 6 is a simplified flowchart illustrating an implementation mode of the protection method;
FIG. 7 is a block diagram illustrating an alternative embodiment of a terminal; and
FIG. 8 is a partial block diagram illustrating an initialization of a communication by a terminal.

DETAILED DESCRIPTION

The same elements have been designated with the same reference numerals in the different drawings. For clarity, only those steps and elements which are useful to the understanding of the described embodiments have been shown and will be detailed. In particular, the origin and the destination of the data transmitted in communications between a transponder and a terminal have not been detailed, the described embodiments being compatible with any usual communication.

FIG. 1 very schematically shows an example of a communication and remote-supply system comprising a terminal 1 or read and/or write terminal, and a transponder 2.

Generally, terminal 1 (for example, a cell phone or smartphone) comprises a series oscillating circuit, formed of an inductance L1 in series with a capacitor C1 and a resistor R1. This series oscillating circuit is controlled by a device 11 comprising, among others and without this being a limitation, an amplifier or antenna coupler and a transmission control and exploitation circuit especially comprising a modulator/demodulator and a command and data processing circuit (generally, a microprocessor). Device 11 generally communicates with different input/output circuits (keyboard, display, element of exchange with a server, etc.) and/or processing circuits, not shown. The elements of terminal 1 most often draw the power necessary to their operation from a supply circuit (not shown) connected, for example, to the power line distribution system (mains) or to a battery (for example, that of an automobile vehicle or of a portable telephone or computer).

A transponder 2 capable of cooperating with terminal 1 comprises an oscillating circuit, for example, parallel, formed of an inductance L2 in parallel with a capacitor C2 between two input terminals 22 and 23 of a control and processing circuit 21. Terminals 22 and 23 are, in practice, connected to input terminals of a rectifying element (not shown in FIG. 1) having output terminals forming terminals for supplying the circuits internal to the transponder. Such circuits generally comprise a memory and a modulator for transmitting data to the terminal. According to the transponder type (depending on the application and on the tasks that it is supposed to perform), these circuits may also comprise a demodulator of the signals that may be received from the terminal, a microprocessor, and various other processing circuits.

The oscillating circuits of the terminal and of the transponder are generally tuned to a same frequency corresponding to the frequency of an excitation signal of the oscillating circuit of the terminal. This high-frequency signal (for example, at 13.56 MHz) is used not only as a data transmission carrier from the terminal to the transponder, but also as a remote-supply carrier for the transponders located in the field of the terminal. When a transponder 2 is in the field of terminal 1, a high-frequency voltage is generated between terminals 21 and 23 of the resonant circuit of the transponder. This voltage is used to provide the power supply voltage of electronic circuits 21 of the transponder.

FIG. 2 is a block diagram of an embodiment of a terminal 1. As indicated previously, the terminal comprises an oscillating circuit formed of an inductance or antenna L1 in series with a capacitive element C1 and with a resistive element R1. The resistive element is an element of settable value (CONTROLLABLE R1). In the example of FIG. 2, these elements are connected between an output terminal 12 of an amplifier or antenna coupler 14 and a terminal 13 at a reference voltage (generally the ground). An element 15 for measuring the current in the oscillating circuit is interposed, for example, between capacitive element C and ground 13. Measurement element 15 belongs to a phase regulation loop which will be described hereafter. Amplifier 14 receives a high-frequency transmission signal E originating from a modulator 16 (MOD) which receives a reference frequency (signal OSC), for example, from a quartz oscillator (not shown). Modulator 16 receives, if need be, a data signal Tx to be transmitted and, in the absence of any data transmission from the terminal, provides the high-frequency carrier (for example, at 13.56 MHz) capable of remotely supplying a transponder. Capacitive element C1 preferably is a variable-capacitance element controllable by a signal CTRL. The phase of the current in antenna L1 is regulated with respect to a reference signal. This regulation is a regulation of the high-frequency signal, that is, of the carrier signal corresponding to signal E in the absence of data to be transmitted. The regulation is performed by varying capacitance C1 of the oscillating circuit of the terminal to maintain the current in antenna L1 in constant phase relationship with the reference signal. The reference signal for example corresponds to signal OSC provided by the oscillator to the modulator. Signal CTRL originates from a circuit 17 (COMP) having the function of detecting the phase shift with respect to the reference signal and to accordingly modify the capacitance of element C1. The phase measurement is, for example, performed from a measurement of current I in the oscillating circuit by means of measurement element 15. In the shown example, this element is formed of a current transformer comprising a primary winding 151 between element C1 and ground terminal 13, and a secondary winding 152 having a first terminal directly connected to ground and having its other terminal providing a signal MES indicative of the result of the measurement. A current-to-voltage conversion resistor 153 is connected in parallel with secondary winding 152. The result of measurement MES is sent to comparator 17, which accordingly controls the value of capacitive element C1 by means of signal CTRL.

In the embodiment illustrated in FIG. 2, comparator 17 uses the same phase demodulator (not shown) as that which is used to demodulate the signal originating from the transponder and which is possibly received by the oscillating circuit. Accordingly, comparator 17 provides a signal Rx giving back a possible retromodulation of the data received from a transponder to a block 18 symbolizing the rest of the electronic circuits of the terminal.

The response time of the phase regulation loop is selected to be sufficiently long to avoid disturbing the possible retromodulation from a transponder and sufficiently short as compared with the speed at which a transponder passes in the field of the terminal. One can speak of a static regulation with respect to the modulation frequencies (for example, a 13.56-MHz frequency of the remote supply carrier and a 847.5-kHz retromodulation frequency used to transmit data from the transponder to the terminal).

As a variation of the intensity transformer of FIG. 2, other current measurement elements may be used (for example, a resistor).

An example of a phase regulation terminal is described in document EP-A-0857981.

FIG. 3 shows an embodiment of a transponder 2. Between terminals 22 and 23 of the oscillating circuit (inductance and antenna L2 and capacitive element C2 in parallel), is connected a rectifying element 25, for example, a fullwave rectifying bridge. The rectified outputs of bridge 25 are interconnected by a smoothing capacitive element $C_{25}$ and provide a voltage $V_{25}$ to a circuit 26 (ALIM) for managing the transponder power supply. Circuit 26 supplies the other transponder circuits, symbolized by a block 27, with the power necessary to their operation. Elements 25, $C_{25}$, 26, and 27 are, in FIG. 1, comprised in block 21. Circuit 27 samples data between terminals 22 and 23 of the resonant circuit to be able to demodulate the possible data received from the terminal before rectification. Further, circuit 27 comprises so-called retromodulation capacitive and/or resistive elements, not shown, capable of modulating the load (LOAD) formed by the transponder on the field generated by the terminal. This load modification translates, on the terminal side, as a modification of the current or of the voltage of its oscillating circuit (assuming that amplifier or antenna coupler 14, in FIG. 2, is capable of providing a constant current). This current or voltage modification, detected by the intensity transformer (15, FIG. 2) or by any other measurement element (for example, the voltage measurement across capacitive element C1), enables the terminal to decode the data received from the transponder.

The fact that the phase is regulated on the terminal side enables using current and voltage measurements in the oscillating circuit of the terminal to deduce information relative to the transponder coupling when it is in the field of the terminal.

Such information takes into account, in particular, the coupling between the transponder and the terminal, that is, the coefficient of the coupling between the oscillating circuit of the terminal and that of the transponder. This coupling coefficient essentially depends on the distance separating the transponder from the terminal. The coupling coefficient, designated as k, between the oscillating circuits of a transponder and of a terminal, always ranges between 0 and 1.

The position where the transponder is placed against the terminal is considered as the maximum coupling position. Indeed, the antennas of the transponder and of the terminal cannot be brought closer to each other, unless the terminal package is eliminated.

It is further now known that an optimum coupling position $k_{opt}$, corresponding to the position at which voltage $V_{C2}$ recovered across the transponder (more specifically across its antenna) is maximum, exists between the terminal and the transponder. This optimum coupling position does not necessarily correspond to the maximum coupling position.

FIG. 4 shows an example of the shape of voltage $V_{C2}$ recovered on the transponder side according to normalized coupling $k/k_{opt}$.

The curve starts from the origin of ordinates (zero voltage) for a zero coupling. This corresponds to a distance from the transponder to the terminal such that no signal can be sensed by the transponder. Voltage $V_{C2}$ reaches a maximum $V_{C2opt}$ for an optimum coupling coefficient $k_{opt}(k/k_{opt}=1)$, then decreases to an intermediate value $V_{C2(1)}$ reached at coupling 1. The maximum coupling position is at a given location of this curve, but not necessarily at the optimum coupling position. This, in particular, depends on the different values of the capacitive and resistive elements.

Other remarkable points of the curve of FIG. 4 are points of inflexion where ratio $k/k_{opt}$ is respectively equal to $1/\sqrt{3}$ and to $\sqrt{3}$, and where voltage $V_{C2}$ has the same value on the transponder side.

Relations expressing voltage value $V_{C2}$ according to the ratio of the current coupling to the optimum coupling and linking these values to current I in the oscillating circuit of the terminal have become usual. For example, such relations are provided in document EP-A-2114019 (B8723-07-RO-225).

According to the described embodiments, it is provided to exploit these relations to force the bearer of the transponder to come as close as possible to the terminal. The aim then is to avoid for a pirate device, generally more bulky or of different nature than the transponder for which the terminal is intended to establish a communication with the terminal while being far away from it.

Another aim is to reassure the bearer of the transponder. Indeed, applications often concern payments or authentications. The fact to only enable a communication to be established when the transponder is "laid" on the terminal reassures the user.

For this purpose, it is provided to force the user to place the transponder in a quasi-contact position (distance shorter than 1 mm), preferably in mechanical contact, with the terminal package, be it by moving the terminal or the transponder according to cases. This package comprises the communication antenna. This therefore amounts to forcing the transponder to be in a position of maximum coupling with its terminal. To achieve this, the transmission of a request to a transponder is only allowed from the moment that the terminal detects this maximum coupling position. The notion of contact used herein relates to a mechanical contact with the terminal package, that is, a position where the antennas of the terminal and of the transponder are as close as possible to each other. It is not an electric contact, the communication and the possible remote supply of the transponder always being performed with no electric contact.

The position corresponding to a zero coupling (FIG. 4) corresponds to a position of the terminal with no transponder. Current I (FIG. 2) in the antenna or the oscillating circuit of the terminal has a so-called no-load value, noted $I_V$ or $I_{NO-LOAD}$. This no-load value corresponds to the value while no transponder is in the field of the terminal.

As indicated, for example, in above-mentioned document EP-A-2114019, the ratio of current coupling k to optimum coupling $k_{opt}$ is linked to the no-load current and to the current value, noted I, of current I by the following relation:

$$(k/k_{opt})^2 = I_V/I - 1.$$

This relation may also be written as:

$$I_V/I = (k/k_{opt})^2 + 1.$$

In the optimum coupling position ($k=k_{opt}$), the current is $I_{opt}=I_V/2$. Further, there appears from the above formula that, in optimum coupling position, ratio $I_V/I=2$.

FIG. 5 illustrates the variation of ratio $I_V/I$ according to coupling k.

This curve is remarkable in that it is linear from the zero coupling ($I_V/I=1$) through the point where the optimum coupling provides a ratio $I_V/I=2$. Two other remarkable points appear on the curve of FIG. 5. These points are the points of inflexion in the curve of FIG. 4. In the positions corresponding to these points of inflexion, this translates, on the terminal side, as a current ratio $I_V/I$ respectively equal to 1.33 ($k=k_{opt}/\sqrt{3}$ and 4 ($k=\sqrt{3} \cdot k_{opt}$).

It is also known that value $V_{C2max}$ is reached for a value of current coupling k which is either lower or greater than the optimum coupling.

Thus, measuring current I and knowing no-load current $I_V$ is sufficient to determine current coupling k with respect to optimum coupling $k_{opt}$.

It should be noted that when it is spoken of measuring current I, the obtaining of data representative of current I is considered. However, a measurement of the current is preferred to a measurement of the voltage, which is more difficult to compare.

FIG. 6 is a simplified flowchart of an implementation mode of the transaction protection method.

The terminal periodically measures (block 41, MES $I_t$) the current value of current I in its oscillating circuit. The measurement periodicity is selected to be as short as possible while remaining compatible with the time necessary to exploit the measurements (to execute the method between two measurements). After each measurement, the current value is compared with the no-load value stored while no transponder is present in the field of the terminal (block 42, $I_i=I_v$?). Such a storage is, for example, performed in a terminal initialization phase.

If the current value is equal to the no-load value (output Y of block 42), this means that no transponder is present in the field and it is proceeded to a next iteration of the measurements (block 43, $NEXT_i$). If the current value is different from the no-load value (output N of block 42), this means that there is an element in front of the terminal. It is, however, not known for the time being whether it is an authorized transponder or a pirate device, and the distance between the transponder and the terminal remains to be determined.

The ratio between the no-load value of current $I_v$ and current value $I_i$ is then calculated and this ratio is compared with ratio ($I_v/I_{i-1}$) calculated at the previous iteration (block 44, $I_v/I_i=I_v/I_{i-1}$?) and stored. This test amounts to determining whether the distance between the transponder and the terminal varies.

If the distance varies (output N of block 44), that is, the user moves one of the two elements with respect to the other, the transponder cannot be in contact with the terminal. The sending of a polling request by the terminal to the transponder is then forbidden (block 45, DO NOT SEND REQ) and it is looped onto a next measurement (block 43).

Usually, a terminal periodically and permanently sends polling requests to possible transponders present in its field. Here, this sending of requests is restricted to only be performed once it is known that a transponder which appears to be authorized is in the field.

If the distance no longer varies (output Y of block 44), the current ratio is then compared (block 46, $I_v/I_i>I_v/I_{lim}$?) with a ratio with a limiting current $I_v/I_{lim}$. Limiting value $I_{lim}$ corresponds to a known value for a given terminal capable of operating with a family of transponders for which it is provided. The value of limiting current $I_{lim}$ is determined, for example, on design of the terminal or in an initial configuration phase. The aim is to determine and to store the current at the maximum coupling with an authorized transponder type. Several limiting current values may be stored to authorize several transponder types.

If the current ratio is greater than the ratio with the limiting current (output Y of block 46), this means that the current coupling is greater than the maximum coupling. The transponder may thus be a pirate device and it is proceeded to the input of block 45 forbidding the sending of a request.

In the opposite case (output N of block 46) and according to a simplified embodiment, it is considered that an authorized transponder is laid against the reader and that it is not a pirate device. The sending of a request by the terminal is then authorized (block 47, SEND REQ).

According to a first optional variation illustrated in dotted lines, as long as the transponder is not stopped against the terminal package (output N of block 44), it is checked whether the current ratio is greater than the previous ratio (block 48, $I_v/I_i>I_v/I_{i-1}$?). If it is (output Y of block 48), this means that the card is approaching and it is proceeded to step 43. If it is not (output N of block 48), this means that the card is moving away and before proceeding to the next iteration, the sending of requests is forbidden (block 45).

Allowing/forbidding the sending of one or several requests amounts, in a simple embodiment, to modifying the state of a bit (flag) conditioning the sending of requests REQ. As a variation, step 45 may be omitted, which means there then is no proper forbidding procedure. The terminal simply only enters a polling process (sending of requests) if an authorized transponder, in contact, is detected.

According to another optional variation, the relations between the coupling and the current in the oscillating circuit of the terminal are exploited to have the maximum coupling coincide with the optimum coupling, if possible, and thus optimize the security of the communication. Indeed, this imposes an operating point such that, as soon as the transponder moves away, this reflects as a decrease in the recovered voltage.

According to this variation illustrated in dotted lines in FIG. 6, once tests 44 and 46 have validated the fact that the maximum coupling position has been reached, a comparison (block 49, $I_v/I<2$?) of the current value of ratio ($I_v/I$) with 2, that is, with the optimum coupling position, is performed. If the current position is lower than the optimum coupling position (output Y of block 49), this means that the optimum coupling cannot be reached. Indeed, resistance R1 preferentially is, at the initialization, at its minimum value, and its value can no longer be increased without adversely affecting other functional aspects of the system. The request is then sent (block 47, SEND REQ).

In the opposite case (output N of block 49), a variation (block 50, INCREASE R1 AND REACH $I_v/I<=2$) of resistance R1 of the oscillating circuit of the terminal is caused until the maximum coupling is smaller than or equal to the optimum coupling. Such an optional setting is known per se (see the above-mentioned document). This then enables to make sure that the transponder remote supply can only decrease monotonically and decreasingly if the transponder moves away. The communication will then be rapidly cut if the transponder moves away and the interposition of a pirate device between the terminal and the transponder is thus avoided, even once the communication has been initiated. The limit is however selected to maintain the possibility of a sufficient contactless power transfer for the transponder circuits to be properly supplied.

FIG. 7 is a block diagram to be compared with that of FIG. 2 partially illustrating an embodiment of a circuit 30 (controllable R1) for varying the value of resistance R1. In this example, a variable resistor 31 is connected in series with a fixed resistor 32, the two resistors 31 and 32 forming the current resistive element of the terminal.

Current transformer 15 measures current $I_i$ and delivers a measurement to circuit 36, which calculates ratio $I_v/I_i$. The value of this ratio is then compared by a comparison circuit 37 (COMP) with a reference value ($I_v/I$)cons that may be smaller than or equal to 2 according to the second variation of FIG. 6.

The result provided by comparator 37 is used to control the value of resistive element 31 with the reference value by means of a control circuit 38 (CT). The other terminal elements are identical to those described in relation with FIG. 2. However, in the example of FIG. 7, circuit 30 is placed on the side of ground terminal 13 rather than on the side of output terminal 12 of amplifier 14 (not shown in FIG. 7). Current transformer 15 used for the measurement and the phase control is interposed between capacitive element C1 and circuit 30. Capacitance C1 is preferably also variable, although this has not been illustrated in FIG. 7.

An example of a switchable resistor circuit that may be used to implement the resistive selection of the value of resistance R1 is, for example, described in the above-mentioned document.

FIG. 8 illustrates a mechanism for sending requests REQ from a terminal to a transponder. This mechanism, which is usual per se, is usually permanently implemented in a terminal but is, according to the described embodiments, only implemented at block 47.

As soon as it is powered on and in operation, the transponder read-write terminal starts (block 60, ST) after a turn-on, initialization, and test phase, a standby procedure during which it waits for a communication to be established with at least one transponder. This procedure essentially comprises periodically sending (block 47) a polling sequence (REQ) to transponders that may be present in the field of the terminal. By implementing the embodiment of FIG. 6, this request sending 47 is only performed once the fact that the transponder is in contact with the terminal has been validated. After each sending of a polling request 47, the reader monitors (block 62, ATQ?) the reception by its demodulator of a response message ATQ from a transponder which would have entered its field. In the absence of a response, the reader loops onto the sending of a polling 47. When it receives a response ATQ, it passes to a mode where it is checked that the transponder actually is a transponder intended for it as well as to a possible anti-collision mode (block 63) to individualize the transponders in its field.

Various embodiments have been described, various alterations, modifications, and improvements will occur to those skilled in the art. In particular, the dimensions to be given to the resistors in the implementation of the variations and the values of the limiting currents and of the different thresholds, as well as the periodicity of the measurements and iterations, depend on the application and more specifically on the transponder family to which a given transponder is dedicated. Further, the inequality relations may correspond to strict or non-strict inequalities. Further, the practical implementation of embodiments is within the abilities of those skilled in the art based on the functional indications given hereabove, by using the hardware and software tools usually present in terminals. It should be noted that the implementation of these embodiments requires no modification of the transponder and is only performed on the reader side.

Such alterations, modifications, and improvements are intended to be part of this disclosure, and are intended to be within the spirit and scope of the present invention. Accordingly, the foregoing description is by way of example only and is not intended to be limiting. The present invention is limited only as defined in the following claims and the equivalents thereto.

What is claimed is:

1. A method to protect communication between an electromagnetic transponder and a terminal, comprising:
   attempting to transmit a polling request by the terminal; and
   allowing transmission of the polling request only when the electromagnetic transponder is in mechanical contact or in quasi-mechanical contact with a terminal package, the package including a communication antenna wherein the allowing includes:
      storing a no-load value of current in an oscillating circuit of the terminal when no transponder is in a field of the terminal;
      periodically measuring a first value of current in the oscillating circuit of the terminal;
      based on a first comparison, while the first value is determined to equal the no-load value, repeating the periodically measuring;
      based on the first comparison, when the first value is determined not to equal the no-load value:
         calculating a ratio between the no-load value of current and the first value of current;
         storing the calculated ratio in a second value;
         performing a second comparison between said second value to a third value of said calculated ratio, said third value calculated in a previous iteration; and
         when the second value is determined to be different from the third value, repeating the periodically measuring, the calculating the ratio, the storing the calculated ratio, and the performing the second comparison.

2. The method of claim 1, wherein, when the second value and the third value are determined to be equal:
   performing a third comparison between the second value and a threshold;
   based on the third comparison, allowing transmission of the polling request when it is determined the threshold has not been reached; and
   based on the third comparison, disallowing transmission of the polling request when it is determined the threshold has been exceeded.

3. The method of claim 2, wherein when it is determined said threshold has been reached, preceding transmission of the polling request by an increase in a value of a resistive element of the oscillating circuit if the second value is greater than 2.

4. The method of claim 1, comprising,
   blocking transmission of the polling request when the second value is smaller than the third value.

5. A terminal to communicate with an electromagnetic transponder, comprising:
   a processor;
   an oscillating circuit;
   a current measuring circuit;
   a controllable inductive circuit coupled to the processor, the oscillating circuit, and the current measuring circuit; and
   at least one storage element, wherein the processor is arranged to determine when the electromagnetic transponder is in mechanical contact or in quasi-mechanical contact with a terminal package of the terminal, the determination made by:
      determining a no-load value of current in the oscillating circuit corresponding to a value of current in the oscillating circuit when no electromagnetic transponder is in a field of the terminal;
      periodically measuring a first value of current in the oscillating circuit until the first value of current in the oscillating circuit is determined to be different from the no-load value of current in the oscillating circuit;
      after it determined that the first value of current in the oscillating circuit is different from the no-load value of current in the oscillating circuit, calculating a ratio between the no-load value of current and the first value of current:
      comparing the calculated ratio to a second value, the second value being an earlier calculated ratio stored after a previous iteration of calculating the ratio;
      permitting a transmission from the terminal via the controllable inductive circuit only when the calculated ratio is determined to be different from the second value; and
      storing the calculated ratio as the second value in the at least one storage element.

6. The terminal of claim 5, wherein the terminal is arranged within a cell phone.

7. The terminal of claim 5, wherein the determination is further made by:
when the calculated ratio is determined not to be different from the second value, comparing the calculated ratio to a threshold;
based on comparing the calculated ratio to the threshold, permitting the transmission when it is determined the threshold has not been reached; and
further based on comparing the calculated ratio to the threshold, not permitting the transmission when it is determined the threshold has been exceeded.

8. The terminal of claim 7, wherein when it is determined the threshold has been reached, preceding the transmission by an increase in a value of a resistive element of the oscillating circuit if the calculated ratio is greater than 2.

9. The terminal of claim 7, wherein the determination is further made by:
blocking the transmission when the calculated ratio is smaller than the second value.

10. The terminal of claim 5, wherein the transmission includes a polling request.

11. The terminal of claim 5, wherein the processing circuit drives a modulator, wherein the modulator generates a high-frequency transmission signal and passes the high-frequency transmission signal to the controllable inductive circuit, and wherein the current measuring circuit is arranged to measure current of the controllable inductive circuit.

12. A device, comprising:
a processing means;
an oscillating circuit means;
a current measuring means;
an inductive means controllable by the processing means and coupled to the oscillating circuit means and the current measuring means; and
a storage means, wherein the processing means is arranged to make a determination, the determination indicating when an electromagnetic transponder is in mechanical contact or in quasi-mechanical contact with a terminal package of the inductive means, the determination made by:
determining a no-load value of current in the oscillating circuit representative of a value of current in the oscillating circuit when no electromagnetic transponder is in a field of the terminal package of the inductive means;
measuring with the current measuring means a first value of current in the oscillating circuit;
repeating the measuring iteratively until the first value of current is determined to be different from the no-load value of current in the oscillating circuit;
after it determined that the first value of current is different from the no-load value of current, calculating with the processing means a ratio between the no-load value of current and the first value of current;
comparing the calculated ratio to a second value, the second value being an earlier calculated ratio stored after a previous iteration of calculating the ratio;
allowing the inductive means controllable by the processing means to transmit data from the device only when the calculated ratio is determined to be different from the second value; and
after each iteration, storing the calculated ratio as the second value in the storage means.

13. The device of claim 12, wherein the device is a mobile device.

14. The device of claim 12, further comprising:
a comparison means, wherein when the calculated ratio is determined not to be different from the second value, comparing the calculated ratio to a threshold using the comparison means, and based on comparing the calculated ratio to the threshold, allowing the controllable inductive means to transmit when it is determined the threshold has been reached.

15. The device of claim 14, wherein when it is determined the threshold has not been reached, preceding a transmission by increasing a value of a resistive element means if the calculated ratio is greater than 2.

16. The device of claim 12, further comprising:
a blocking means, the blocking means arranged to block a transmission when the calculated ratio is smaller than the second value.

17. The device of claim 12, wherein a transmission using the inductive means includes a polling request.

18. The device of claim 12, wherein the processing means drives a modulator means, wherein the modulator means generates a high-frequency transmission signal and passes the high-frequency transmission signal to the inductive means, and wherein the current measuring means is arranged to measure current in the inductive means.

* * * * *